United States Patent [19]

Foust et al.

[11] Patent Number: 4,730,152

[45] Date of Patent: Mar. 8, 1988

[54] VEHICLE POWER ANTENNA CONTROL WITH DRIVE STRESS LIMITING

[75] Inventors: Jeff A. Foust, Farmersville; Donald E. Graham, Dayton; Richard E. Wainwright, Kettering; Gary R. Denton, Vandalia, all of Ohio

[73] Assignee: General Motors Corporation, Detroit, Mich.

[21] Appl. No.: 931,060

[22] Filed: Nov. 17, 1986

[51] Int. Cl.[4] ........................ G05B 19/29; H01Q 1/10

[52] U.S. Cl. ........................ 318/603; 318/266; 318/468; 318/434; 318/563; 343/715; 343/903

[58] Field of Search ............... 318/266, 267, 603, 466, 318/468, 563, 565, 626, 434; 343/711, 712, 713, 714, 715, 900, 901, 903, 889

[56] References Cited

U.S. PATENT DOCUMENTS

| | | | |
|---|---|---|---|
| 2,949,608 | 8/1960 | Fischer | 343/903 |
| 3,143,696 | 8/1964 | Harris | 318/266 |
| 4,190,841 | 2/1980 | Harada | 343/903 |
| 4,198,637 | 4/1980 | Sand | 343/715 |
| 4,203,059 | 5/1980 | Kraus | 318/446 |
| 4,330,782 | 5/1982 | Hashimoto et al. | 343/715 |
| 4,414,551 | 11/1983 | Tadauchi et al. | 343/903 |
| 4,506,266 | 3/1985 | Mizuno et al. | 343/715 |
| 4,649,398 | 3/1987 | Yamamoto et al. | 318/603 X |

*Primary Examiner*—William M. Shoop, Jr.
*Assistant Examiner*—Patrick C. Keane
*Attorney, Agent, or Firm*—Robert M. Sigler

[57] ABSTRACT

A power antenna control for a motor vehicle comprises a Hall effect device responsive to motor armature rotation to generate pulses for equal predetermined increments of antenna travel. These pulses are applied to both position and stall counters. In extension, the antenna drive is stopped when the position counter reaches a number corresponding to a predetermined extended position, which may be full extension or some lesser extension. In retraction, the stall counter is used with a clock to indicate stall which, when detected, causes the antenna drive to be stopped. Automatic current limiting for drive torque limitation during stall is activated only when the position counter indicates a limited position range near full retraction. Further during retraction, if the antenna is stopped within a small position range of full rectraction, it is reset to a count indicating full retraction. The system eliminates the need for hard stall sensing reaction switches and thus reduces antenna drive cable fatigue.

6 Claims, 12 Drawing Figures

VEHICLE POWER ANTENNA CONTROL WITH DRIVE STRESS LIMITING

BACKGROUND OF THE INVENTION

This invention relates to control apparatus for a vehicle mounted power antenna, and particularly to that portion of the control which causes the drive motor to cease its operation at the proper time while limiting stress on the drive mechanism.

The typical commercial power antenna apparatus has drive means for extending or retracting the antenna relative to the vehicle body which is controlled in response to a signal from the vehicle radio. When the radio is turned on, a signal is sent to the antenna control to initiate extension; and extension continues until full extension is attained, usually as indicated by a reaction switch. When the radio is turned off, a signal is sent to the antenna drive to initiate retraction; and retraction continues until full retraction is attained, as indicated by the reaction switch. The reaction switch responds to the high force in the antenna drive mechanism which is produced when the antenna stalls at the limit of its operation, either fully extended or fully retracted. However, the high stress of a hard stall at full stall current, repeated with every antenna actuation, increases wear and fatigue of the drive cable and is thus undesirable. The useful life of the antenna drive cable and perhaps the remainder of the antenna drive mechanism might be extended if the control were able to stop the antenna in the desired position while limiting the stress on the antenna drive mechanism.

SUMMARY OF THE INVENTION

The invention is thus a power antenna control for a motor vehicle having antenna drive means effective to extend and retract the antenna relative to the vehicle, the antenna drive means including a DC motor having an armature, the control comprising, in combination: pulse signal means responsive to movement of the antenna drive means to generate pulses for equal predetermined increments of antenna travel, a first counter responsive to the pulse signal means while the antenna is extending to change its count in a first direction and while the antenna is retracting to change its count in the opposite direction to thereby maintain a count indicative of antenna position, a second counter responsive to the pulse signal to count in a first direction, means responsive to the first counter during antenna extension to deactivate the antenna drive means when the count of the first counter indicates a predetermined extended antenna position, means effective to periodically monitor the count of the second counter and reset the count to an initial value and, when said monitored count is less than a predetermined count indicating motor stall, to generate a stall signal, means responsive to the stall signal during antenna retraction to deactivate the antenna drive means and, if the count of the first counter is within a predetermined count of full retraction, to reset the count of the first counter to the count indicating full retraction, means activatable to limit the current in the motor armature to a predetermined maximum value and means responsive to the first counter to activate the current sensing means only when the count of the first counter is within a range corresponding to a predetermined range of antenna position close to full retraction.

The antenna drive cable is thus not subjected to the high stress of hard stall in normal antenna extension or retraction. In extension, the antenna is stopped in the desired position in response to an antenna position count from a Hall effect device before hard stall occurs. In retraction, the antenna is stalled with current limiting for a soft stall condition, which imposes a much lower force on the drive cable than a hard stall; and the same Hall effect device provides indication of the stall. In addition, the full current limiting is only applied in a narrow range of antenna positions near full retraction so that full motor torque is available throughout most of the antenna position range. Furthermore, the antenna position count is reset with each retraction for accuracy of control. Further details and advantages will be apparent from the accompanying drawings and following description of a preferred embodiment.

DESCRIPTION OF THE PREFERRED EMBODIMENT

Figure 1:
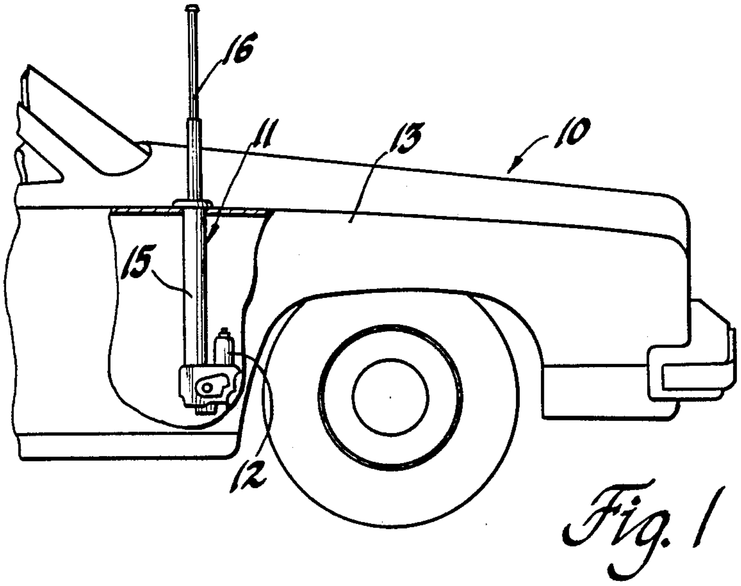
FIG. 1 is a partial cutaway view of a motor vehicle with a power antenna.

Referring to FIG. 1, a motor vehicle 10 includes a power telescoping antenna assembly 11 comprising a motor and control apparatus 12 and a down tube 15 within a fender 13 or other body area of vehicle 10 and a telescoping rod antenna 16 projecting vertically from tube 15 out of fender 13. The construction of the antenna 16, down tube 15 and motor and control apparatus 12 are standard except as described in this specification. Antenna 16 is driven up and down by an electric motor in motor and control apparatus 12 by means of a cable, not shown, in response to control signals generated in motor and control apparatus 12. Examples of the construction of power telescoping antenna apparatus may be seen in the Edwards U.S. Pat. Nos. 4,527,168, issued July 2, 1985, Hussey et al 4,323,902, issued Apr. 6, 1982 and Milbrandt et al 4,288,666, issued Sept. 8, 1981. This specification describes control apparatus for use in apparatus 12 to control the motor.

Figure 3:
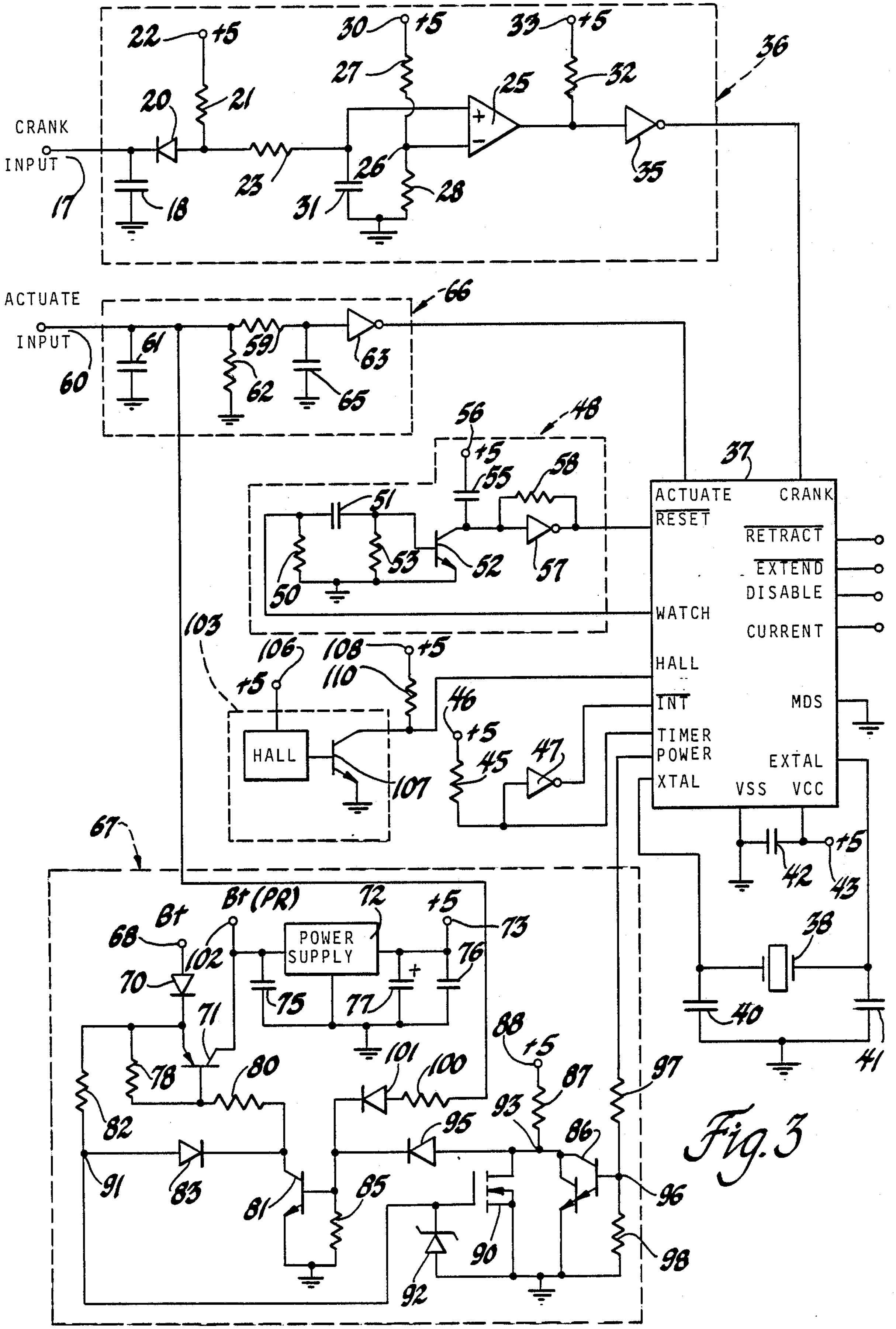

Referring to FIG. 3, a crank input signal is applied to terminal 17, labeled CRANK INPUT. This signal is obtained from the vehicle engine starting or cranking system. For example, the signal may be the voltage at the the start terminal of the ignition switch or, in the case of this embodiment, the bulb test terminal of the ignition switch Terminal 17 is connected through a capacitor 18 (0.001uF) to ground and to the cathode of a diode 20 having an anode connected through a resistor 21 (4.76K) to terminal 22, which is connected to a 5 volt DC power supply to be described at a later point in this specification. The anode of diode 20 is further connected through a resistor 23 (100K) to the non-inverting input of a comparator 25 having an inverting input connected to the junction 26 of a resistor 27 (4.7K) and a resistor 28 (4.7K) forming a voltage divider connected between a terminal 30, which is connected to the 5 volt DC power supply already mentioned, and ground. The non-inverting input of comparator 25 is further connected through a capacitor 31 (0.01uF) to ground; and the output of comparator 25 is connected through a resistor 32 (10K) to a terminal 33, which is connected to the 5 volt DC power supply, and to the input of an inverter 35 (74HC14), the output of which comprises a CRANK signal. These elements form a crank signal conditioning circuit 36, which squares, level shifts and buffers the crank signal for its application as the CRANK signal to a digital computer 37.

Computer 37 is a single chip microcomputer such as the Motorola (R) MC68704P2 or its equivalent, and the CRANK signal may be applied to one of its input terminals, which is labeled CRANK in FIG. 3. Computer 37 further has terminals labeled XTAL and EXTAL connected to opposite terminals of an 8 MHz crystal 38 with capacitors 40 and 41 (30 pF) connected from the terminals to ground. Crystal 38 determines the clock rate of computer 37. Computer 37 obtains its electrical power through a VSS terminal connected to ground and a VCC terminal connected through a terminal 43 to the 5 volt DC power supply and, through a capacitor 42 (0.1 uF), to terminal VSS. An MDS terminal of computer 37 is grounded; a TIMER terminal of computer 37 is connected through a resistor 45 to a terminal 46, which is connected to a +5 volt power supply to be described; and the TIMER terminal is also connected through an inverter 47 (74HC14) to a NOT INT terminal of computer 37.

A "watch dog" circuit 48 provides automatic reset of computer 37 in case of malfunction. Computer 37 is programmed to provide periodic output pulses on an output terminal labeled WATCH, which terminal is connected to ground through a resistor 50 (22K) and through a capacitor 51 (0.1 uF) to the base of an NPN bipolar transistor 52 (2N3904) which is connected to ground through a resistor 53 (22K). Transistor 52 has a grounded emitter and a collector connected through a capacitor 55 (0.47 uF) to a terminal 56, connected to the 5 volt DC power supply, and further to the input of an inverter 57 (74HC14) bypassed by a resistor 58 (330K). The output of inverter 57 is connected to the NOT RESET input of computer 37. In operation, capacitor 55, resistor 58 and inverter 57 form a free running oscillator when transistor 52 is turned off for longer than a predetermined time period. This produces repeated pulses to the RESET line of computer 37. In order to prevent this during normal computer operation, the output square wave from the WATCH output of computer 37 is applied through capacitor 51 to the base of transistor 52. Due to the combination of capacitor 51 and resistors 50 and 53, transistor 52 is turned on each positive transition of the square wave to bring capacitor 55 back to full charge before it can discharge sufficiently to allow inverter 57 to reset the computer. However, if the WATCH output of computer 37 stops in either a high or a low state for longer than the predetermined period, transistor 52 will remain turned off and thus allow the oscillator to reset computer 37 repeatedly as already described. If a reset results in correct operation of computer 37, the square wave output will once again appear to turn on transistor 52 and once again hold off the oscillator.

An actuate signal is received from the vehicle radio at terminal 60. This signal is at a high voltage level when the radio is operational and antenna extension is required and is otherwise at a low voltage level. Terminal 60 is labeled ACTUATE INPUT and is connected through a capacitor 61 (0.001uF) and parallel resistor 62 (10K) to ground and through a resistor 59 (100K) to the input of an inverter 63 (74HC14), which input is also connected through a capacitor 65 (0.01uF) to ground. These elements form an actuate signal conditioning circuit 66, the output of which is obtained from the output of inverter 63 and applied as the ACTUATE signal to an input terminal of computer 37 labeled ACTUATE. Notice that, because of inverter 63, the ACTUATE signal to computer 37 corresponding to radio operation, and therefore antenna extension, is at a low voltage level.

A power latch circuit 67 is controllable by computer 37 in a manner to be described. A terminal 68, connected to the standard vehicle 12 volt B+power supply, is further connected through a forward biased diode 70 (1N4004) to the emitter of a PNP bipolar transistor 71 (ZTX551) having a collector connected to the input of a standard power supply chip 72 (LM2931AT5.0). The output of power supply chip 72 is connected to a terminal 73, which terminal comprises the 5 volt DC power supply referred to at other points in this specification. The reference of chip 72 is connected to ground. The input of power supply chip 72 is further connected through a capacitor 75 (0.1 uF) to ground; and the output of power supply chip 72 is further connected through parallel capacitors 76 (0.1 uF) and 77 (470 uF) electrolytic) to ground. Power supply chip 72 converts the 12 volt DC vehicle electric power to 5 volt DC power for the use of the control system; and transistor 71 controls the application of the 12 volt power to power supply chip 72.

Transistor 71 has a base connected to its emitter through a resistor 78 (1.5K) and through a resistor 80 (1K, 1/4W) to the collector of an NPN transistor 81 (2N3904) having a grounded emitter. The emitter of transistor 71 is further connected through a resistor 82 (10K) and diode 83 (CR5C) to the collector of transistor 81. Transistor 81 has a base connected through a resistor 85 (10K) to ground. An NPN Darlington transistor 86 (2N5306) has a grounded emitter and a collector connected through a resistor 87 (2.2K) to a terminal 88 connected to the 5 volt DC power supply (terminal 73, connection not shown). An FET 90 (2N7000) is connected in parallel with Darlington transistor 86 and has a gate connected to the junction 91 of resistor 82 and the anode of diode 83 and further connected through a zener diode 92 (1N4744 15 V) to ground. Junction 93 of resistor 87, the collector of Darlington transistor 86 and the drain of FET 90 is connected to the anode of a diode 95 (1N4004), the cathode of which is connected to the base of transistor 81. The base of Darlington transistor 86 is connected to the junction 96 of resistors 97 (1K) and 98 (10K), which are connected in series between the output terminal of computer 37 labeled POWER and ground. Terminal 60, labeled ACTUATE INPUT, is connected through a resistor 100 (3.3K) to the anode of a diode 101 (1N4004), the cathode of which is connected to the base of transistor 81. Finally, the collector of transistor 71 is connected to a terminal 102, which provides switched B+(12 volts) to the motor control apparatus to be described in connection with FIG. 2.

In the operation of the power latch, a high voltage signal on terminal 60, labeled ACTUATE INPUT, is communicated to the base of transistor 81 to turn it on and thus bias transistor 71 into conduction. This provides the switched B+at terminal 102 and activates power supply chip 72 to provide 5 volts DC at terminal 73, which is connected to terminals 22, 30, 33, 43, 46 and 56, as well as others to be identified at a later point. The voltage on terminal 73 is also provided to terminal 88 to keep transistor 81 turned on when terminal 60 goes low and thus allow computer 37 to control the turnoff of transistor 71.

When the program in computer 37 determines that it is time to power down, it provides a high output from terminal POWER to the base of Darlington transistor 86. This pulls junction 93 down near ground voltage and, the actuate signal having been removed from terminal 60, turns off transistor 81. Transistor 81 thus turns off transistor 71 to remove the 5 volts DC from terminals 73 and 88. The B+(12 volts) voltage is now provided through resistor 82 to the gate of FET 90 to turn it on; and it prevents transistor 81 from being turned on by Darlington transistor 86 and resistor 87 due to an inadvertent voltage fluctuation from computer 37 as it is powering down. Once FET 90 is turned on, the power supply is essentially latched off until the next high actuate signal appears on terminal 60. Thus an external signal may initiate operation of the control system, but, after that signal is removed, computer 37 controls when the system is deactivated. For minimal power consumption when the system is deactivated, the power is cut off completely from most circuit elements and FET 90, which has negligible current leakage from its gate, is used in parallel with Darlington transistor 86 to hold the power latch in its deactivated state.

One additional input to computer 37 is the HALL terminal, which receives the signal from a digital Hall effect sensing unit 103. This unit is powered through a terminal 106 provided with the 5 volt DC power from terminal 73 and has an output comprising the collector of an NPN bipolar transistor 107 having a grounded emitter. The output of Hall unit 103 is connected through a resistor 110 to a terminal 108 provided with 5 volt DC power from terminal 73 and is further connected directly to the HALL input of computer 37. Hall unit 103 is mounted on the circuit board containing the remainder of the circuit described in the vicinity of the drive motor for antenna 16. It further includes a magnet mounted on the output shaft of the motor which passes near sensing means within apparatus 103 with each rotation of the motor armature, regardless of motor rotational direction. Thus, movement of the antenna in either direction causes pulses to be generated by the sensor at the collector of transistor 107, which is part of the sensor package; and these pulses are communicated to computer 37, which is programmed to sense them. Hall unit 103 comprises pulse signal means indicative of antenna movement.

Figure 2:
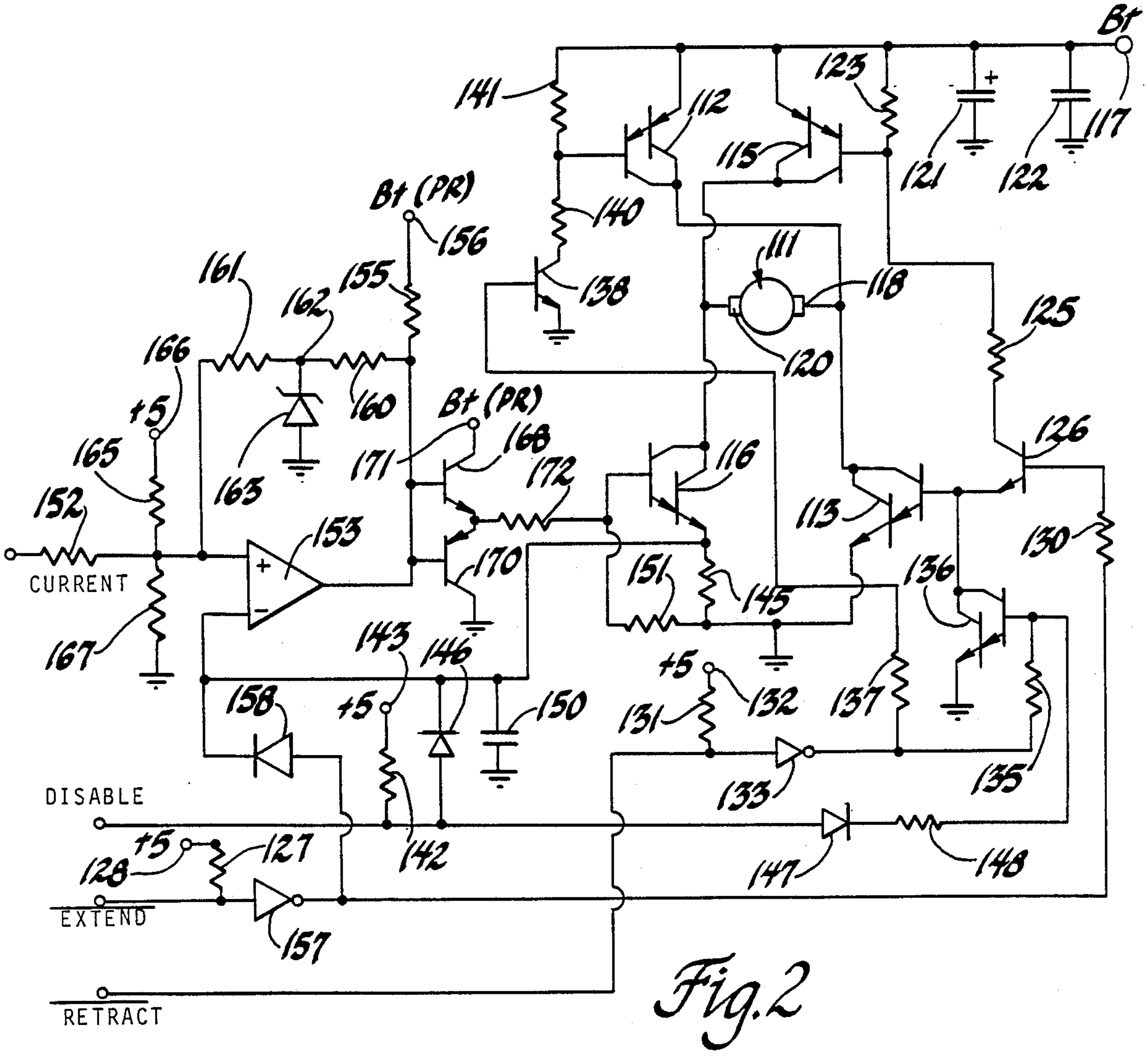
FIGS. 2 and 3 are circuit diagrams of a preferred embodiment of a power antenna control according to the invention suitable for use with the antenna of FIG. 1.

There are four output terminals of computer 37 used to control motor operation and shown in FIG. 3 with the labels NOT RETRACT, NOT EXTEND, DISABLE and CURRENT. Due to lack of space in FIG. 3, their connections are shown in FIG. 2. These outputs are of the open collector type, in which a transistor with a grounded emitter has a collector output. When the transistor is turned off, the output is considered high, since all such outputs are connected through pull-up resistors to the +5 volt power supply. When the transistor is turned on, the output voltage is considered low, since the collector of the transistor is pulled down near ground.

Referring to FIG. 2, a DC motor 111 has a permanent magnet field and a wound armature, the latter of which is connected in an "H" switch configuration with power Darlington transistors 112, 113, 115 and 116. PNP Darlington transistor 112 (2N6040) has an emitter connected to B+(12 volt) terminal 117, which is connected to the vehicle electric power supply, and a collector connected to one armature terminal 118 of motor 111. The same armature terminal is connected to the collector of NPN Darlington transistor 113 (D44E2), which has a grounded emitter. Similarly, PNP Darlington transistor 115 (2N6040) has an emitter connected to B+terminal 117 and a collector connected to the other armature terminal 120 of motor 111. Finally, NPN Darlington transistor 116 (D44E2) has a collector connected to armature terminal 120 and an emitter connected to ground through a resistor 145 (0.1, 2W). Terminal 117 is connected to ground through an electrolytic capacitor 121 (47 uF) and a parallel capacitor 122 (0.001 uF).

The base of transistor 115 is connected through a resistor 123 (4.7K) to B+terminal 117 and through a resistor 125 (470) to the collector of an NPN bipolar transistor 126 (MPSA05) having an emitter connected to the base of transistor 113. The NOT EXTEND terminal of computer 37 is connected through a resistor 127 (10K) to a terminal 128 provided with 5 volts DC and further connected through an inverter 157 (74HC14) and series resistor 130 (3K) to the base of transistor 126. The NOT RETRACT terminal of computer 37 is connected through a resistor 131 (10K) to a terminal 132 provided with 5 volts DC and further connected through an inverter 133 (74HC14) and series resistor 135 (51K) to the base of an NPN Darlington transistor 136 (2N5306) having a grounded emitter and a collector connected to the base of transistor 113 and the emitter of transistor 126. The output of inverter 133 is further connected through a resistor 137 (3K) to the base of an NPN transistor 138 (MPSA05) having a grounded emitter and a collector connected through a resistor 140 (470) to the base of transistor 112, which base is connected to the B+terminal 117 through a resistor 141 (4.7K).

The DISABLE terminal of computer 37 is connected (a) through a resistor 142 (10K) to a terminal 143 provided with 5 volts DC, (b) through a diode 146 (1N4004) to the emitter of transistor 116 and (c) through a diode 147 (1N4004) and series resistor 148 (39K) to the base of transistor 136. The emitter of transistor 116 is connected through a capacitor 150 (0.001 uF) to ground; and the base of transistor 116 is connected through a resistor 151 (4.7K) to ground.

The CURRENT terminal of computer 37 is connected through a resistor 152 (1K) to the non-inverting input of a comparator 153 (LM2903N) having an output tied up through a pull up resistor 155 (4.7K) to terminal 156 provided with switched B+(PR, 12 V) from terminal 102. The output of inverter 157 is connected through a diode 158 (1N4004) to the inverting input of comparator 153, which is also connected to the emitter of transistor 116 and the cathode of diode 146. The output of comparator 153 is connected back through series resistors 160 (10K) and 161 (100K) to the non-inverting input thereof, with the junction 162 of resistors 160 and 161 connected through a zener diode 163 (1N4739 9 V) to ground. The non-inverting input of comparator 153 is further connected through a resistor 165 (100K) to a terminal 166 provided with 5 volts DC and further connected through a resistor 167 (10K) to ground. The output of comparator 153 is further connected to the bases of an NPN bipolar transistor 168 (MPSA05) and a PNP bipolar transistor 170 (MPSA55).

Transistor 168 has a collector connected to a terminal 171 provided with switched B+(PR, 12 V) from terminal 102 and an emitter connected to the collector of transistor 170 and through a resistor 172 to the base of transistor 116. The emitter of transistor 170 is grounded.

Motor 111 is the electric motor in apparatus 12 of FIG. 1 which extends or retracts antenna 16, depending on the direction of activation. The circuit of FIG. 2 has a number of operational modes. The EXTEND mode is produced by a low NOT EXTEND signal from computer 37 along with a high NOT RETRACT signal and a low DISABLE signal. The output of inverter 157 goes high and turns on transistor 126 which, in turn, turns on transistors 115 and 113 to establish current flow through the armature of motor 111 from terminal 120 to terminal 118 and cause motor 111 to drive antenna 16 out of tube 15. The high signal from inverter 157 is further applied through diode 158 to the inverting input of comparator 153, which compares it to the voltage on its non-inverting input. The full operation of this device will be described later in connection with the CURRENT signal; however, for now it is sufficient to know that the high voltage on the inverting input from diode 158 is greater in magnitude than any voltage expected on its non-inverting input; and the output thus switches low to turn off transistor 168 and turn on transistor 170. These transistors hold off transistor 116 to prevent a short circuit through transistors 115 and 116 across the 12 volt power supply.

The RETRACT mode of operation is produced by a low NOT RETRACT signal along with a high NOT EXTEND signal and a low DISABLE signal from computer 37. The output of inverter 133 goes high to turn on transistor 138 and thus transistor 112. Inverter 133 further turns on transistor 136, which keeps transistor 113 turned off to prevent a short across the 12 volt power supply through transistors 112 and 113. The operation of transistor 116 may be controlled by the output of comparator 153 in a current limiting circuit with feedback from current sensing resistor 145, the current limiting value being switchable by the CURRENT signal from computer 37. The operation of the current limiting signal will be described more completely with reference to the CURRENT signal; however, briefly, as long as the current level through transistor 116 is normal, the voltage across resistor 145, which is applied to the inverting input of comparator 153, is not sufficient to overcome the reference voltage applied to the non-inverting input thereof. Thus the output of comparator 153 stays high and turns on transistor 168 to turn on transistor 116. A current path is established through the armature of motor 111 from terminal 118 to terminal 120 to cause motor 111 to retract antenna 16 into tube 15. This action may be halted by comparator 153 switching low to turn off transistor 116 in response to a high voltage drop across resistor 145 indicative of stall current in motor 111.

The DYNAMIC BRAKING mode of operation has NOT RETRACT and NOT EXTEND signals both low to turn on transistors 112 and 115. Each of these transistors has built in reverse bypass diodes which complete the circuit for dynamic braking action during retract or extend movement of motor 111. In order to ensure no activation of transistors 113 and 116 in this mode, the mode is initiated by first providing a high DISABLE signal from computer 37. This is applied through diode 147 to turn on transistor 136 and thus hold off transistor 113. It is also applied through diode 146 to the inverting input of comparator 153 to turn off transistor 168, turn on transistor 170 and hold off transistor 116 as described above for the EXTEND mode. Once transistors 113 and 116 are off, the low NOT EXTEND and NOT RETRACT signals may be generated by computer 37 to establish the dynamic braking paths. Although the circuit, as already described, includes additional means to turn and hold off transistors 113 and 116 in response to the low NOT EXTEND and NOT RETRACT signals, the DISABLE signal provides assurance that no momentary shorts will be allowed during the switching process.

The CURRENT signal from computer 37 provides computer control over the current limiting process already described by allowing computer switching of the reference voltage generating circuit comprising resistors 152, 165 and 167. With a low DISABLE signal voltage, the voltage on the inverting input of comparator 153 is free to follow the voltage across resistor 145 due to the current through transistor 116. With a high CURRENT output, resistors 165 (100K) and 167 (4.7K) set a voltage close to 0.25 volts at the non-inverting input of comparator 153 and the output of comparator 153 stays high to enable conduction through transistor 116, since it is most unlikely, with a 0.1 ohm current sensing resistor 145, that the voltage across resistor 145 can rise in normal operation to the level necessary to send the output of comparator 153 low. Although current limiting is present, the allowed current is sufficiently high that essentially full motor torque is available to move the antenna. Full current limiting, that is the current limiting effective to reduce motor torque during stall at the fully retracted position in order to reduce drive cable fatigue, is thus effectively deactivated. However, when the CURRENT output of computer 37 goes low, resistor 152 (1K) is effectively added in parallel to resistor 167. This causes the voltage at the non-inverting input of comparator 153 to drop to a predetermined level (such as, for example, 0.05 volts) which will be exceeded by the voltage across resistor 145 at a predetermined current through transistor 116. This will cause the output of comparator 153 to switch low and turn on transistor 170 to turn off transistor 116. This, of course, reduces the current through resistor 145 to zero, which causes comparator 153 to once again switch on the transistors and activate motor 111. The cycle repeats in an oscillating pattern which generates an average current less than the current limit and therefore a limited torque when the motor stalls, which reduces the stress on the antenna drive cable while the system detects the stall in a manner to be described at a later point.

The operation of the system will be described with reference to the flow charts shown in FIGS. 4–7. Computer 37 is primarily under the control of a main program, described in FIGS. **4*a*–4*c*. It also uses subroutines shown in FIGS. 5 and 6 and a timed interrupt routine described in FIGS. 7*a*–7*d***. It will be helpful in understanding the main program to first describe the subroutines and the accompanying interrupt routine.

Figure 5:
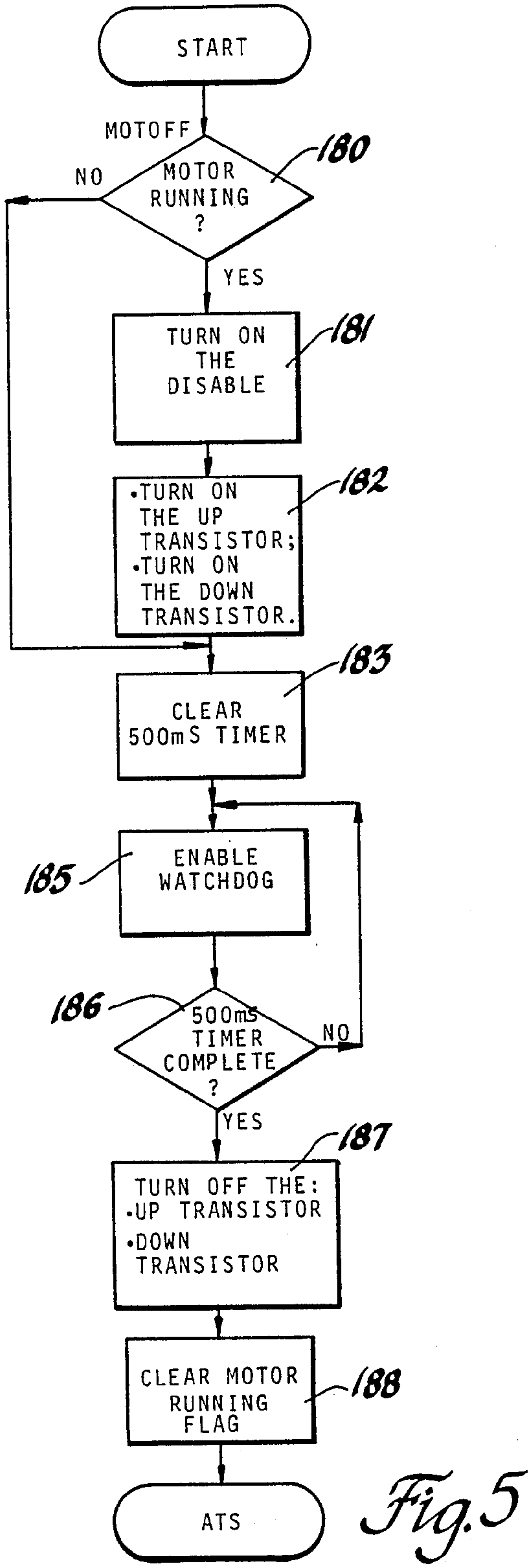

Subroutine MOTOFF, shown in FIG. 5, is used whenever a complete stop of the motor is desired. It basically provides a high DISABLE signal, generates low NOT EXTEND and NOT RETRACT signals to turn on the up and down transistors 112 and 115 for dynamic braking, waits 500 milliseconds and then turns off the up and down transistors. In greater detail, subroutine MOTOFF first determines at decision point 180 if the motor is running by examining a MOTOR RUNNING flag. If it is, then dynamic braking is required; and the DISABLE signal is set high in step 181. The up and down transistors 112 and 115 are then caused to turn on by setting the NOT RETRACT and NOT EXTEND signals low in step 182. The 500 ms timer is cleared for start in step 183; the WATCHDOG flag is set in step 185 to keep the computer from resetting; and a 500 MS TIMER COMPLETE state is determined in decision point 186. If it is not, the program loops back to set the WATCHDOG flag in step 185 until the 500 MS TIMER is complete, at which time the NOT RETRACT and NOT EXTEND signals are set high in step 187 to turn off the up and down transistors and the MOTOR RUNNING flag is cleared in step 188 before the subroutine ends. If the MOTOR RUNNING flag had not been set, decision point 180 would have sent the program to step 183 and bypassed steps 181 and 182. Even when the motor is not running, the 500 millisecond delay in steps 185-186 is not skipped, so that antenna movement will be prevented during rapid, repetitive switching of the radio on and off.

Figure 6:
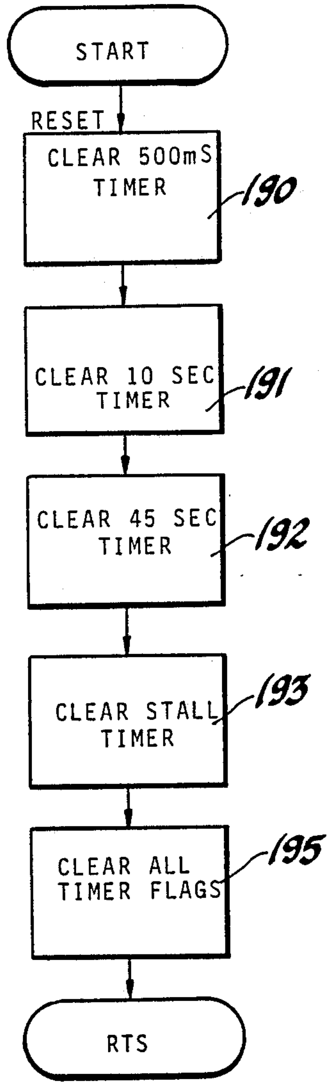

The RESET subroutine, shown in FIG. 6, clears a 500 MS TIMER, a 10 SECOND TIMER, a 45 SECOND TIMER and a STALL TIMER in consecutive steps 190-193, respectively, and then clears all timer flags in step 195.

The interrupt routine TIMINT is shown in FIGS. *7a-7d* and is called by the time interrupt of a real time clock in computer 37 every 2 milliseconds, which occurs when the TIMER output goes high and forces the NOT INT input low through inverter 47, as seen in FIG. 3. Referring to FIG. *7a*, the routine first saves the accumulator, resets a 2 ms timer and refreshes the data direction registers (DDR's) in step 202. It then checks the condition of the Hall sensor by determining if the Hall line is high at decision point 203. If it is not, then the routine determines, at decision point 205, if the HALL LEVEL BIT is set. if it is, then it is cleared in step 206; and the MOTOR RUNNING FLAG is checked at decision point 207. If the motor is running, a STALL COUNT is incremented in step 208. This combination of states indicates a change in the Hall line from high to low with the motor running and is the only condition in which the STALL COUNT will be incremented and the rest of the routine shown in FIG. *7a* will be run. If the Hall effect line is high, the routine sets the HALL LEVEL BIT in step 210 and skips the rest of FIG. *7a* by proceeding to the entry point K in FIG. *7b*. If the HALL LEVEL BIT is determined to be low at decision point 205 or the motor is determined to not be running at decision point 207, the routine proceeds directly to entry point K in FIG. *7b*.

The system senses both antenna motion and antenna position with a single sensor by using the output of the Hall sensor to maintain a STALL COUNT, as shown with reference to step 208, and a two byte position count, now to be described. This position count has a minimum value of zero and a maximum value in this embodiment of 1 in the high byte and 51 in the low byte for a total of 307 defined steps. At positions below step 32 current limiting is enabled; and from step 32 upward it is disabled. At the maximum allowed count of 1, 51 an END OF TRAVEL flag and a FULLY EXTENDED flag are set. The END OF TRAVEL flag is cleared as soon as the count decreases from the maximum allowed, but the FULLY EXTENDED flag is not cleared until an ACTUATE LEVEL flag is reset, for a reason to be described later.

Referring to FIG. *7a*, the routine proceeds from step 208 to determine the status of a DIRECTION flag at decision point 211. If the antenna is moving upward and the flag is set, the low byte COUNT of a position count is incremented in step 212. If the incremented COUNT is determined to be zero at a decision point 213, it must have overflowed; therefore, a high byte COUNT1 of the position count is incremented in step 215. If there was no overflow in COUNT seen at decision point 213, the routine determines, at decision point 216, if COUNT exceeds 31. If so, the current limiting value is raised to a higher predetermined value as previously described by setting the CURRENT output signal high in step 217. From steps 215 or 217 or from decision point 216 with a no answer, the routine proceeds to determine, at decision point 218, if COUNT1 is less than 1 (i.e., equal to zero). If not, then decision point 220 determines if COUNT is less than 51. If not, then an END OF TRAVEL flag and a FULLY EXTENDED flag are set in step 221 before the program proceeds to entry point K. Thus, the system detects the fully extended position through the position count and sets a flag to cause extension to be stopped, through another portion of the program yet to be described, with no stress on the drive cable. In addition, it allows easy modification of the system for selective partial extensions for antennas of selectable length, if desired, by modifying the software to detect different position counts and set appropriate flags.

Returning to decision point 211, if the DIRECTION flag is not set, which means that the antenna is not moving outward, the routine determines at decision point 222 if COUNT is zero. If so, then the routine determines at decision point 223 if COUNT1 is zero. If not, then the routine decrements both COUNT and COUNT1 in step 224 before proceeding to decision point 218. However, If COUNT was found to be greater than zero at decision point 222, the routine proceeds to decrement only COUNT in step 225 before determining if COUNT1 is zero at decision point 226. From this point, if COUNT1 does not equal zero, the routine proceeds to decision point 218, already described. If COUNT1 does equal zero, the routine determines, at decision point 227, if COUNT equals 31. If it does, the current limit function is turned on by setting the CURRENT output low in step 228. From step 228, from decision point 227 if COUNT does not equal 31, from decision point 223 if COUNT1 does equal zero, from decision point 218 if COUNT1 is less than 1 or from decision point 220 if COUNT is less than 51, the routine proceeds to clear the END OF TRAVEL flag in step 230 before advancing to entry point K in FIG. *7b*. Note that the system does not set any flag which indicates full retraction in response to the position count; however, it does control the application of current limiting in response to the position count. The detection of full retraction is accomplished in a different part of the program, yet to be described, in response to a stall count, with current limiting, which is active only through a limited range of antenna position, providing a limit on antenna drive cable stress.

Referring to FIG. *7b*, entry point K leads to step 231, in which a 100 MS TIMER count is incremented. Next, at decision point 232, the routine determines if the 100 ms time duration is complete by examining the 100 MS TIMER count. Since the interrupt routine is run every 2 ms, a count of 50 indicates 100 ms. If the 100 ms is not complete, the routine skips the rest of FIG. 7*b* and all of FIG. 7*c* and proceeds to entry point E on FIG. 7*d*, since the functions skipped occur only at times which are multiples of 100 ms; and therefore both computer time and registers may be saved.

If 100 ms is complete at decision point 232, the routine clears the 100 ms timer count for another cycle at step 233 and determines, at decision point 235, if the ACTUATE signal is high. A high ACTUATE signal indicates no radio operation; therefore, if the answer is yes, the antenna should be moving downward or completely down. First, however, the ACTUATE signal is debounced by an examination of a DEBOUNCE bit or flag at decision point 236. If the DEBOUNCE bit is low, the ACTUATE signal must have just changed state and requires debouncing by setting the DEBOUNCE bit high in step 237. If the DEBOUNCE bit was already high at decision point 236, the routine then determines, at decision point 238, if the ACTUATE LEVEL flag is set. If not, it is set in step 240; and the ACTUATE LEVEL CHANGE flag is then set in step 241.

Similarly, if the ACTUATE signal is found to be low at decision point 235, the routine determines, at decision point 242, if the DEBOUNCE bit is low. If not, it is cleared in step 243. If so, however, the routine determines, at decision point 245, if the ACTUATE LEVEL flag is set. If it is set, it is cleared in step 246; the ACTUATE LEVEL CHANGE flag is set in step 247; and the FULLY EXTENDED flag is cleared in step 248.

From steps 237, 241, 243, or 248, or from decision point 238 if the ACTUATE LEVEL flag is set or from decision point 245 if the ACTUATE LEVEL flag is not set, the routine proceeds to check the CRANK input at decision point 250. The CRANK input signal is also debounced. If the CRANK line is high, the routine checks the CRANK DEBOUNCE bit at decision point 251. If the CRANK DEBOUNCE bit is high, the CRANK LEVEL flag is set in step 252; if it is low, the CRANK DEBOUNCE bit is set in step 253. If the CRANK input is found to be low at decision point 250, the routine checks the CRANK DEBOUNCE bit at decision point 255. If the CRANK DEBOUNCE bit is high, it is cleared in step 256; if it is low, the CRANK LEVEL flag is cleared in step 257. From any of steps 252, 253, 256 or 257 the routine proceeds to entry point M of FIG. 7*c*.

Figure 7A:
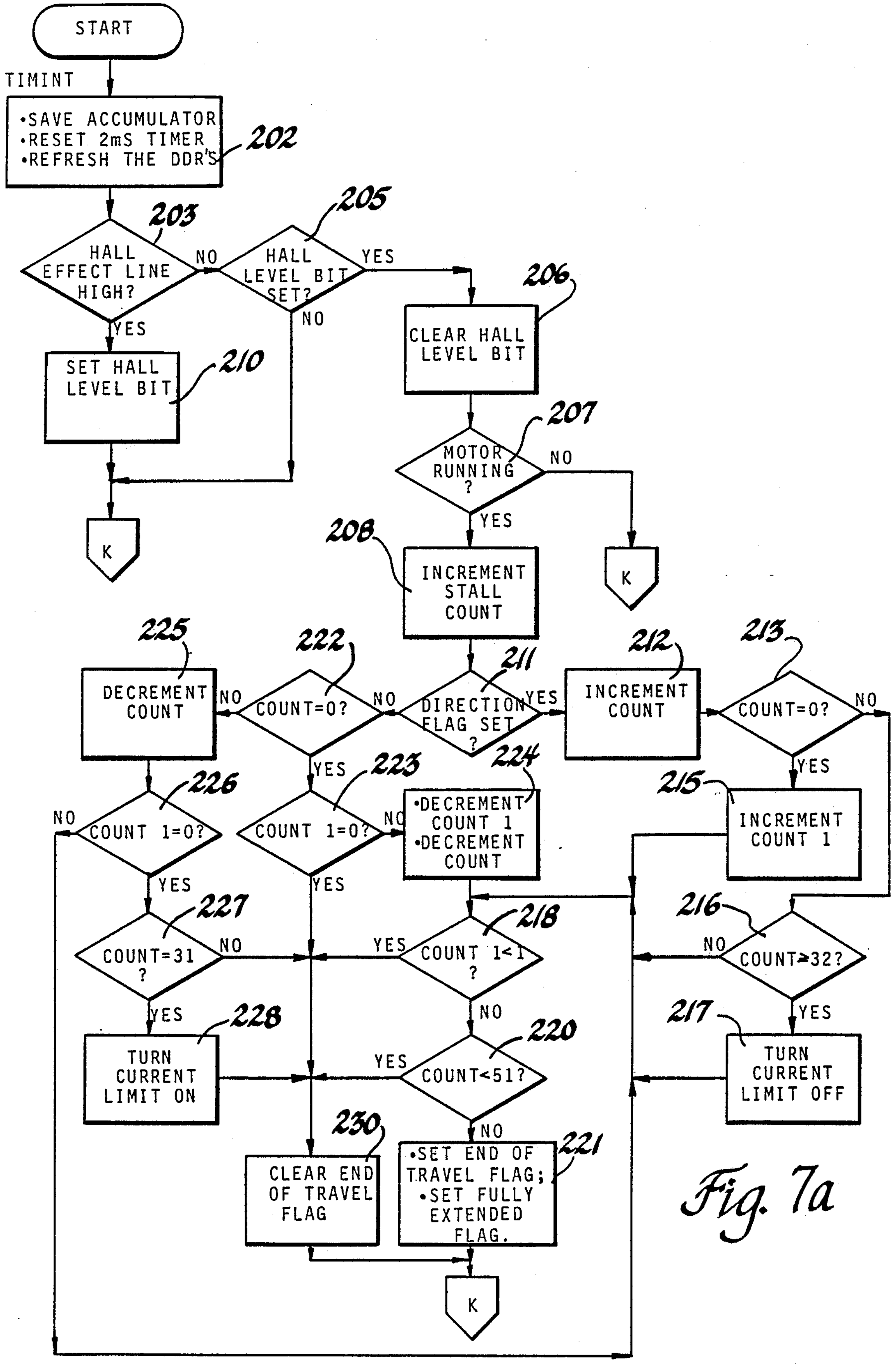
Figure 7B:
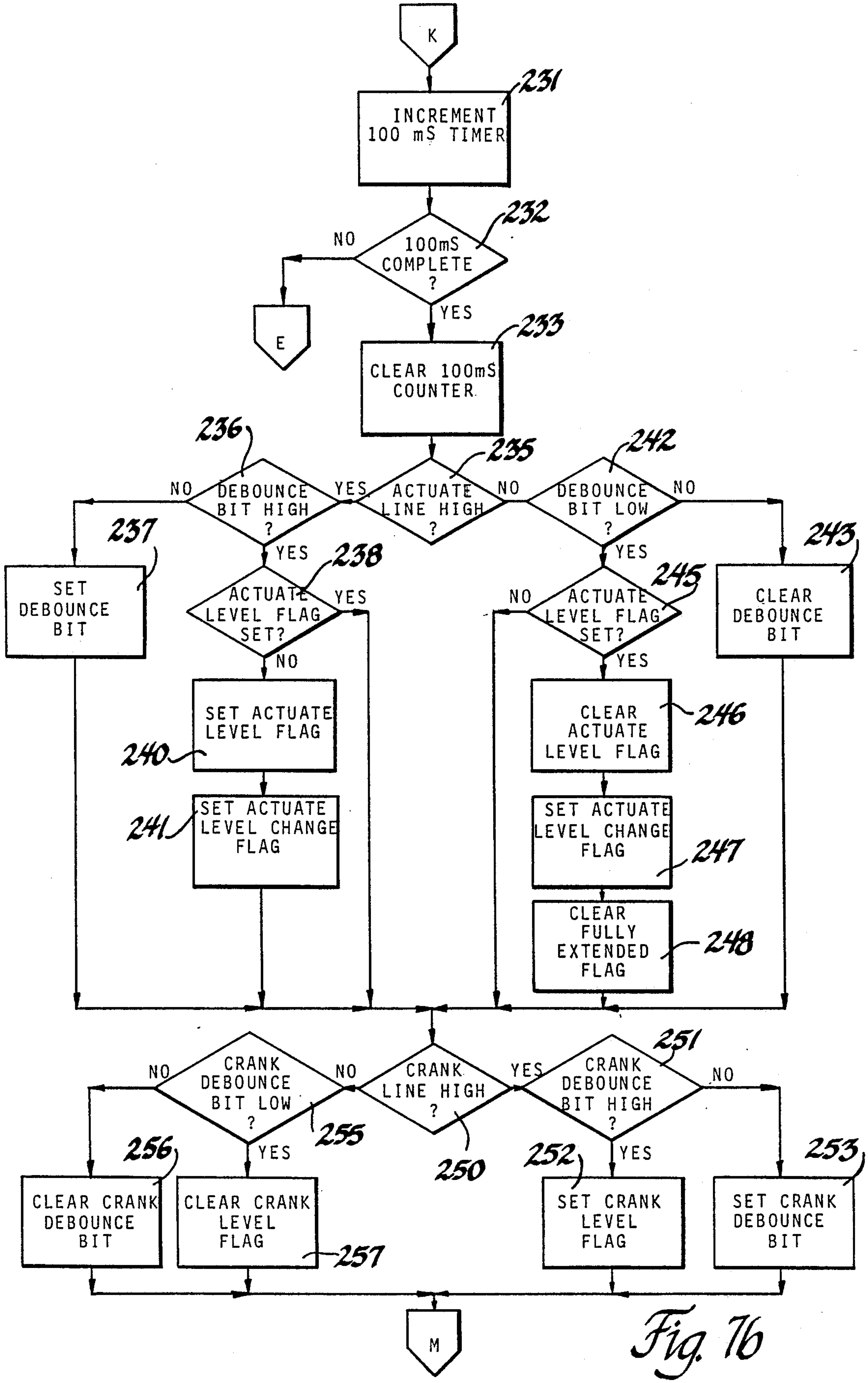
Figure 7C:
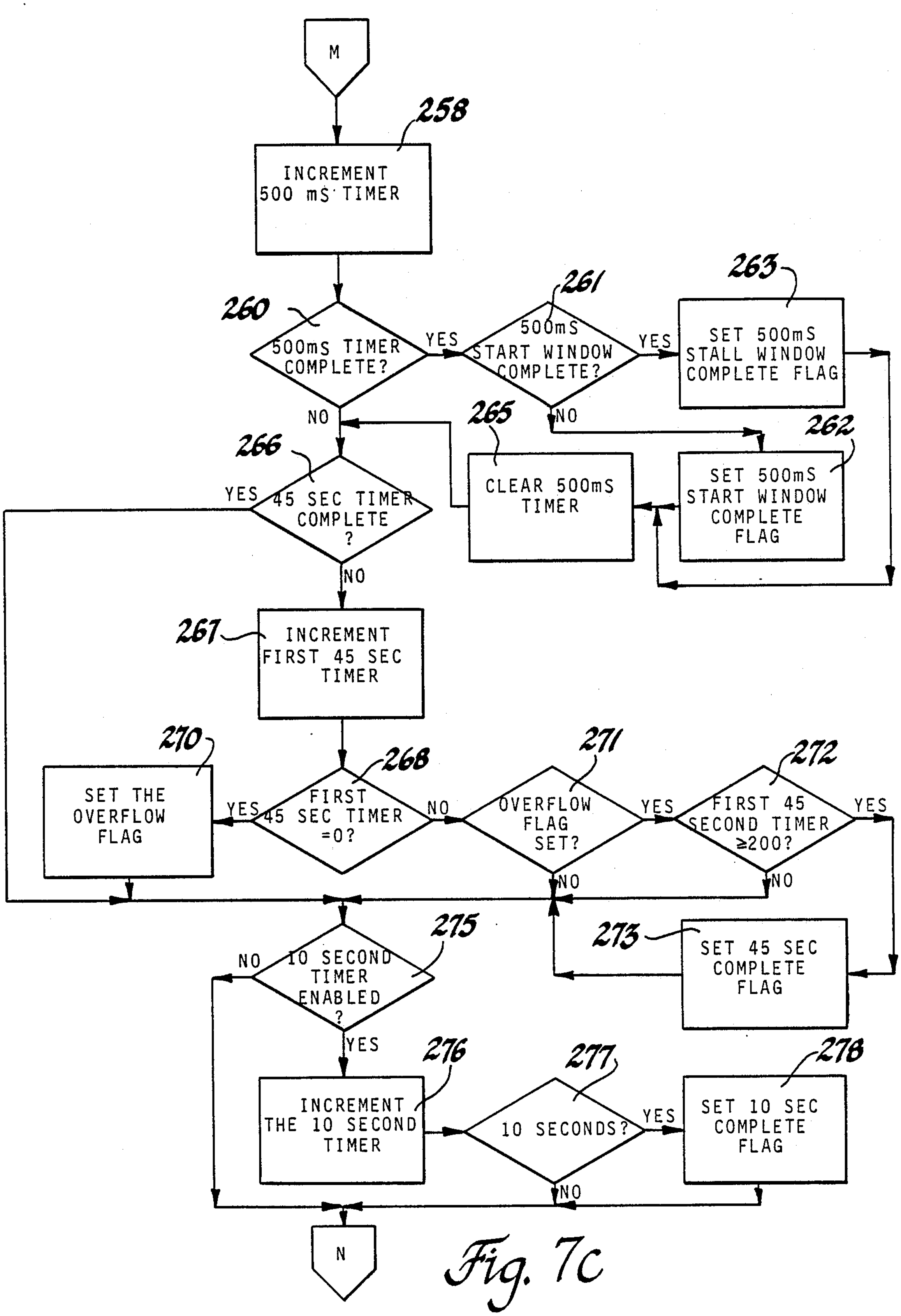
Figure 7D:
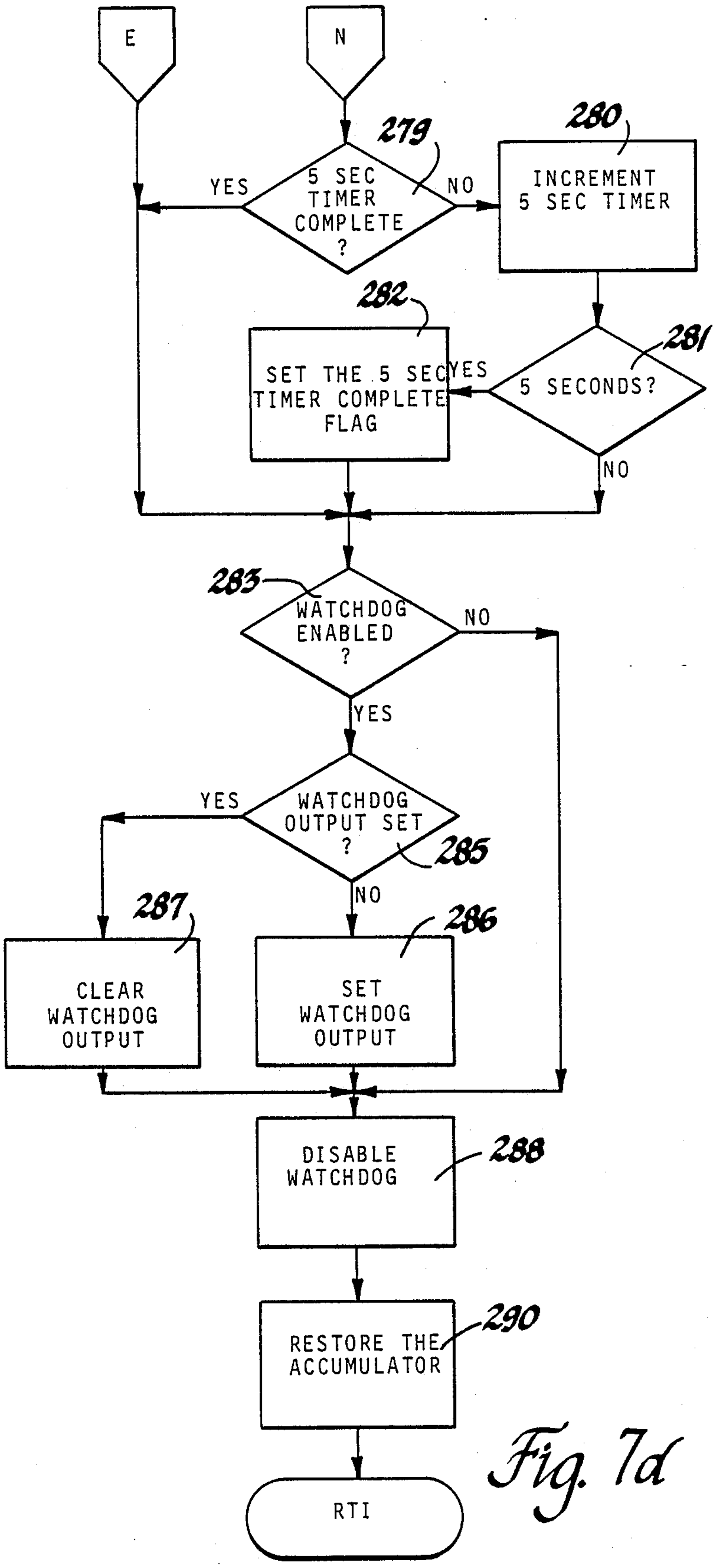

In the chart of FIG. 7*c*, the routine services software timer counts of 500 ms, 45 seconds and 10 seconds and sets various flags when they time out. The 500 MS TIMER is used for the STALL COUNT function to determine, during down movement, when the antenna is completely retracted. It is also used to time a 500 ms startup delay before the STALL COUNT is activated. From entry point M in FIG. 7*c* the routine increments the 500 MS TIMER in step 258 and then determines, at decision point 260, if the 500 MS TIMER is complete. Since this point in the flowchart is reached only every 100 ms, the relevant count is 5. If the answer is yes, the routine determines, at decision point 261, if a 500 ms start window is complete by examining a 500 MS START WINDOW COMPLETE flag. If the answer is no, then the just completed 500 ms period is the first and the 500 MS START WINDOW COMPLETE flag is set in step 262. If this flag was already set, however, the 500 MS STALL WINDOW COMPLETE flag is set in step 263. From either step 262 or step 263 the routine clears the 500 MS TIMER in step 265.

A 45 SECOND TIMER is maintained to time out excessively long motor operation and initiate the power down sequence to stop the antenna driving motor when it has obviously been running too long. From step 265 or from decision point 260 if the 500 MS TIMER was not complete, the routine proceeds to determine, at decision point 266, if the 45 SECOND TIMER is complete. If not, it is incremented in step 267. Since the routine reaches this point once every 100 ms it will require 450 cycles to reach 45 seconds. A byte sized counter will count only to 255 before overflow; therefore provision for overflow is made, with an approximate 45 second count being reached at the count of 200 on the second cycle. From step 267, the routine determines, at decision point 268, if the first 45 second timer equals zero by examining the count. If the answer is yes overflow must have occurred, since the counter was just incremented. Therefore an OVERFLOW flag is set in step 270. If not, the routine next determines, at decision point 271, if the OVERFLOW flag is set. If it is, the routine then determines, at decision point 272, if the first 45 SECOND TIMER equals 200 or greater. If it does, the 45 SECOND COMPLETE flag is set in step 273. On the next cycle, the 45 SECOND COMPLETE flag will be determined to be set at decision point 266; and the routine will proceed to decision point 275 to service the 10 SECOND TIMER. The routine will also proceed to this point from steps 270 or 273 or from decision point 271 if the overflow flag is not set or from decision point 272 if the 45 SECOND TIMER is less than 200.

The 10 SECOND TIMER is provided for timing a 10 second limit of crank inhibit in response to a high CRANK input. At decision point 275, it is determined if the 10 SECOND TIMER is enabled by checking a flag. If it is, it is incremented in step 276 and checked at decision point 277. If 10 seconds has elapsed, a 10 SECOND COMPLETE flag is set in step 278. From step 278, or from decision point 275 if the 10 SECOND TIMER is not enabled or from decision point 277 if the 10 SECOND TIMER has not timed out, the routine proceeds to entry point N of FIG. 7*d*.

A 5 SECOND TIMER is provided for a retry delay on antenna extension. From entry point N of FIG. 7*d*, the routine determines at decision point 279 if the 5 SECOND TIMER count is complete. If not, it is incremented in step 280; and the routine then determines again, at decision point 281, if it is complete. If so, a 5 SECOND TIMER COMPLETE flag is set in step 282. From step 282 or entry point E, or from decision point 279 if the 5 SECOND TIMER is complete, or from decision point 281 if the 5 SECOND TIMER is not complete, the routine proceeds to service the watchdog at decision point 283.

The watchdog circuit described above in connection with FIG. 3 requires a regular square wave output signal from the WATCH output of computer 37 to prevent reset of the computer. This signal is software generated so that it will cease, and the computer will reset, if the program does not behave as designed. The signal is generated in the following steps by alternately setting and resetting the WATCH output signal at 2 ms intervals only while the WATCHDOG flag is set to indicate watchdog enabled. At decision point 283, the routine determines from the WATCHDOG flag if it is enabled. If so, it then reverses the WATCHDOG output by determining, at decision point 285, whether or not the WATCHDOG output is set, setting it in step 286 if it is not or clearing it in step 287 if it is set. From either of steps 286 or 287, as well as from decision point 283 if the WATCHDOG flag was not set, the routine disables the WATCHDOG output in step 288, restores the accumulator in step 290 and returns from the interrupt.

Figure 4A:
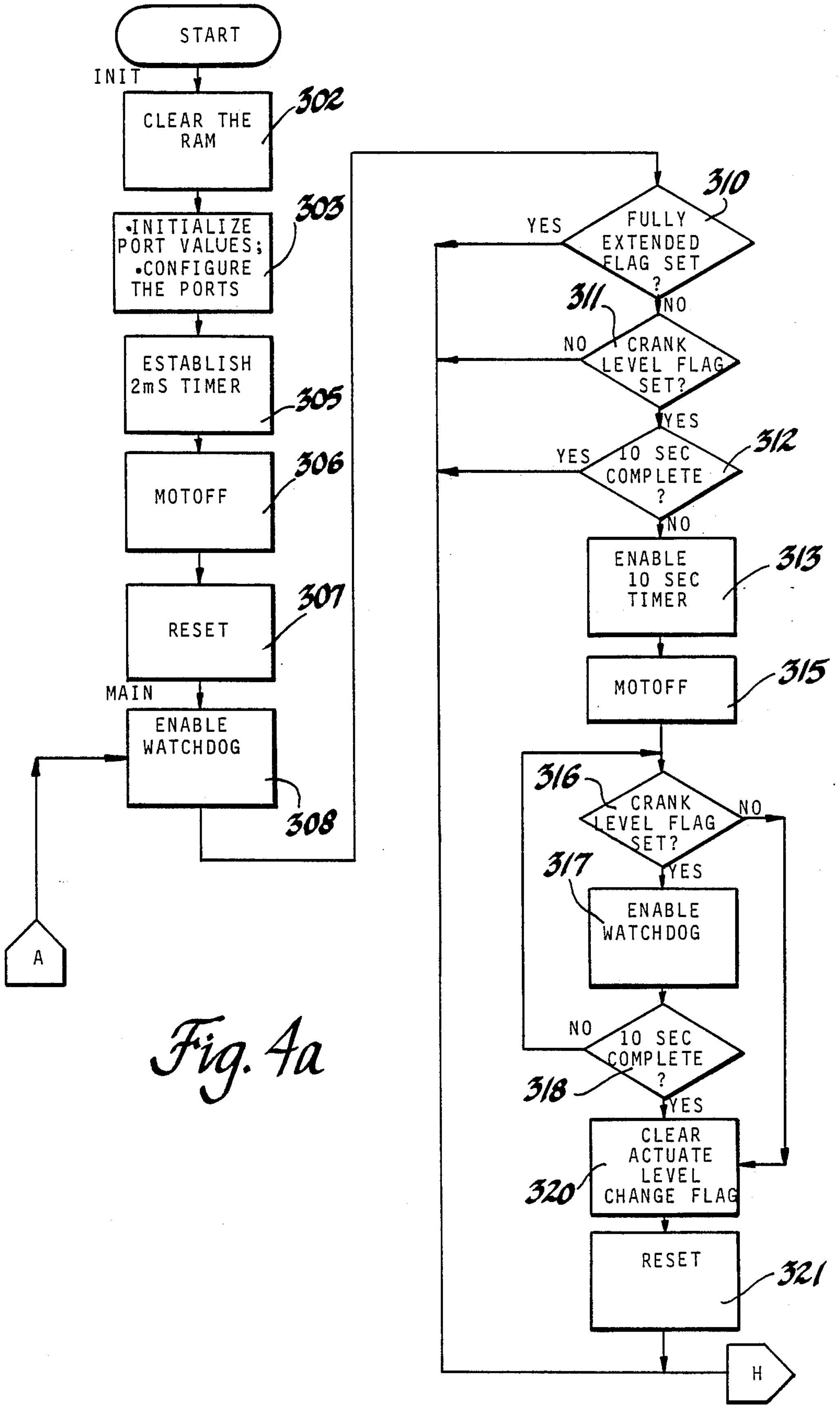
FIGS. 4*a*–4*c*, 5–6 and 7*a*–7*d* are flow diagrams illustrating the operation of the power antenna control of FIGS. 2 and 3.
Figure 4B:
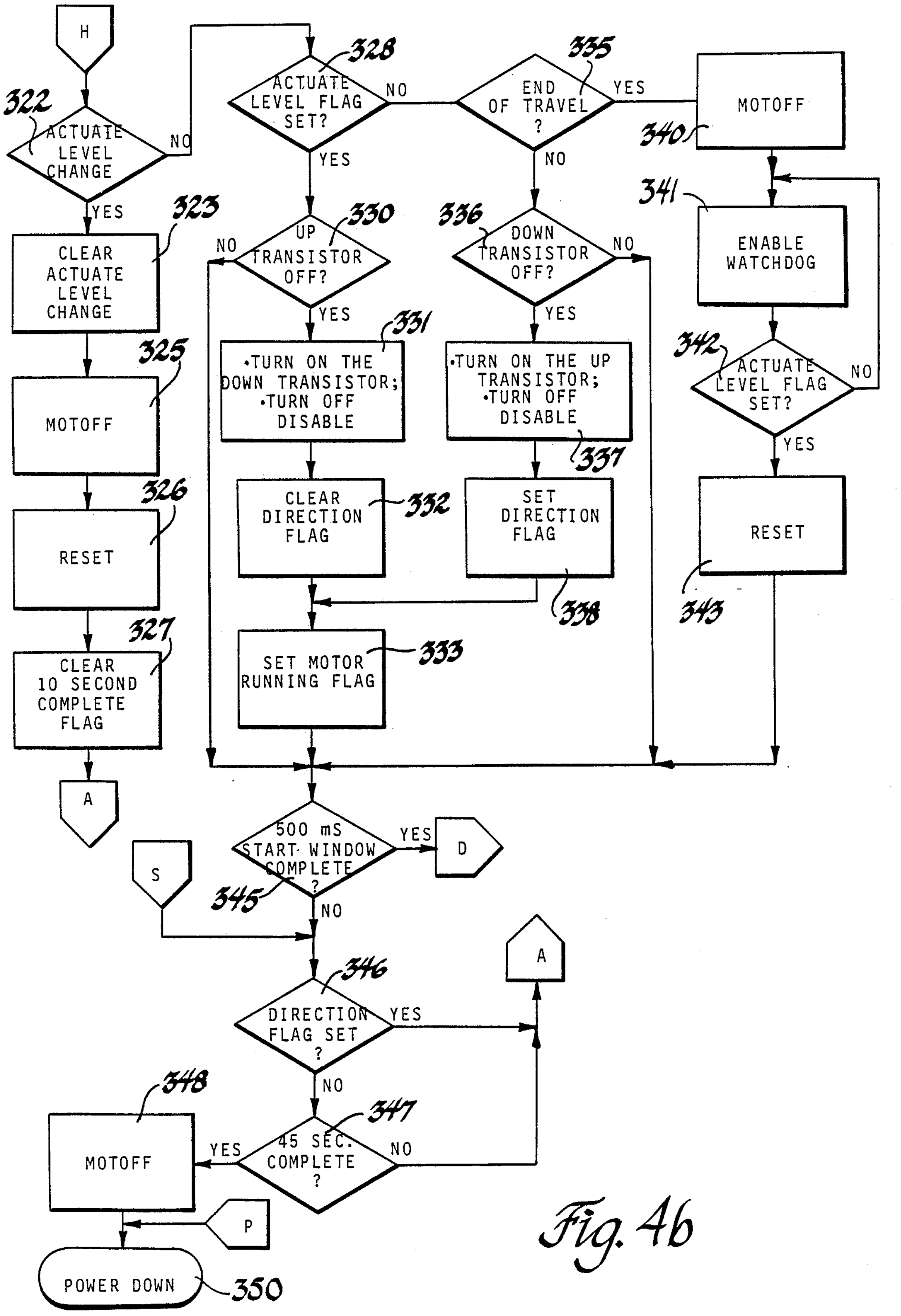
Figure 4C:
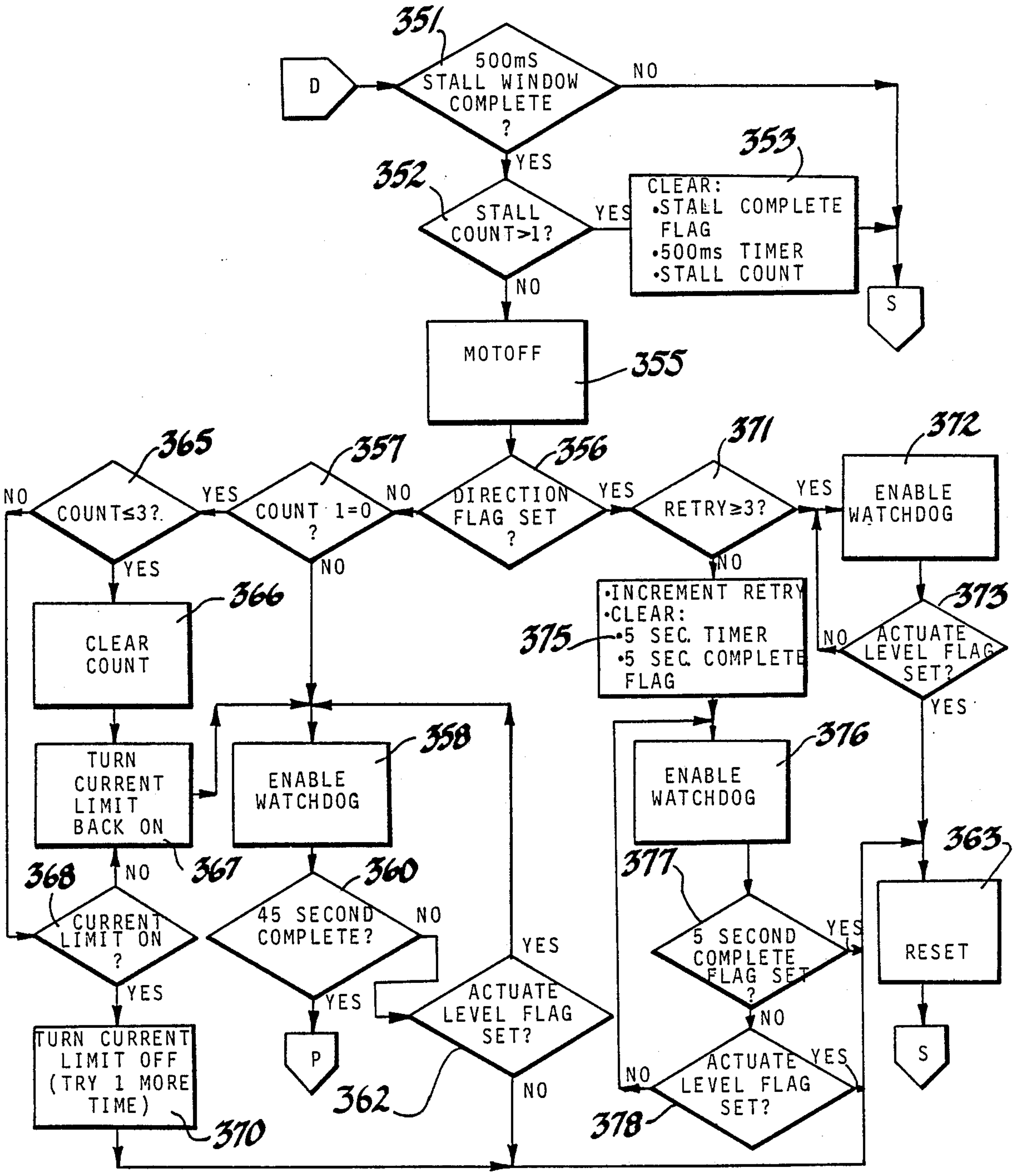

The main routine of computer 37 is shown in FIGS. 4a–4c. An initializing portion INIT runs only when the system is first actuated or reset. The RAM is cleared in step 302; the ports are configured and initialized in step 303; and the 2 ms timer is established for the interrupt in step 305. Next, subroutine MOTOFF is run in step 306 to ensure that the antenna drive motor is stopped and sufficient time is provided to debounce the inputs; and subroutine RESET is run in step 307 to initialize the software timers already described.

The routine enters its MAIN loop at step 308, in which the WATCHDOG flag is set. It then proceeds to a portion of the MAIN loop handling the crank inhibit. Since the antenna is activated to extend or retract in response to a signal indicative of radio operation, anything that affects that operation also affects the antenna. In a typical automotive ignition system, the ignition switch has at least off, run and start positions. The radio may be activated with the ignition switch in its run position; but the power is removed from the radio, regardless of the radio controls, with the ignition switch in its off and start positions. Often, a vehicle operator will just leave the radio turned on so that it always comes on when he operates the vehicle and turns off automatically when he is not operating the vehicle. This can lead, however, to the annoying situation wherein, every time he starts his vehicle, the antenna starts to extend as the ignition switch passes through its run position and then retracts again during engine starting before extending once more as the ignition switch is returned to its run position. In order to eliminate this situation, it is desired to deactivate the power antenna drive during engine cranking with the ignition switch in its start position. Therefore, the MAIN loop stops the antenna by means of the MOTOFF subroutine when the CRANK LEVEL flag is set and thus prevents retraction during engine starting. This not only eliminates the annoyance of the antenna reversal; it also reduces battery load during cranking, when maximum current to the cranking motor is desired.

However, the crank signal is not always dependable in all system configurations. A dependable signal might result from monitoring the start terminal of the ignition switch and looking for a high voltage sufficient to activate the cranking motor. But, for a variety of reasons, that is not always the method chosen. In the case of this antenna, the crank level signal is a ground at the bulb test terminal of the ignition switch. The problem with this is that there are some conditions other than cranking in which this terminal might be grounded. One such is the lighting of a malfunction light on the dashboard. In this case, a false start or CRANK signal will be generated with the ignition switch in its run position. To permit antenna activation in this case, the MAIN loop limits the deactivation of the antenna drive due to a start or false start signal to a predetermined time period deemed sufficient for an engine start, such as 10 seconds. However, this approach leads to yet another possible undesirable situation in another case, wherein the bulb test terminal is grounded with ignition off. If the ignition is turned off with the antenna extended, the system sees a false start signal and delays the antenna retraction for 10 seconds. In order to take care of this possibility, the crank inhibit is not allowed if the FULLY EXTENDED flag is set; and this flag will be set when the ACTUATE signal switches to the state indicating retraction after the antenna has been fully extended.

In order to enable the 10 second timer, the MAIN loop must first determine at decision point 310 that the FULLY EXTENDED flag is not set. This is the reason for the FULLY EXTENDED flag referred to earlier. The MAIN loop must then determine at decision point 311 that the CRANK LEVEL flag is set and determine at decision point 312 that the 10 SECOND TIMER has not already been completed. The loop then enables the 10 SECOND TIMER in step 313, runs subroutine MOTOFF in step 315, and rechecks, at decision point 316, the status of the CRANK LEVEL flag. If the CRANK LEVEL flag is set, the WATCHDOG flag is set in step 317 and the status of the 10 SECOND TIMER is checked at decision point 318. If 10 seconds is not complete, the loop forms a subloop back to decision point 316. However, if 10 seconds is complete at decision point 318, or if the CRANK LEVEL flag is found cleared at decision point 316, the loop proceeds to clear the ACTUATE LEVEL CHANGE flag in step 320, run subroutine RESET in step 321 and proceed to entry H in FIG. 4b. The loop also proceeds to entry H if the opposite answers are found at any of the decision points 310–312.

The MAIN loop next detects a change in the ACTUATE signal and sets the proper motor direction. From entry H in FIG. 4b, the loop checks the ACTUATE LEVEL CHANGE flag at decision point 322. If the flag indicates a change in the ACTUATE signal, it is cleared in step 323; and the loop then runs subroutines MOTOFF and RESET in steps 325 and 326, respectively. The 10 SECOND COMPLETE flag is then cleared in step 327 before the loop returns to its beginning at entry A in FIG. 4a.

If the ACTUATE LEVEL CHANGE flag is found cleared at decision point 322, the loop determines at decision point 328 if the ACTUATE LEVEL flag is set in order to determine desired motor direction. If not, then the direction of travel is retraction or downward movement; and the loop determines at decision point 330, if the up transistor is off, by checking the state of the output port of the NOT EXTEND signal. If it is, then in step 331 the down transistor is turned on by setting the NOT RETRACT output low; and the DISABLE line is set low. This enables antenna retraction. The loop then clears the DIRECTION flag to signal retraction in step 332 and sets the MOTOR RUNNING flag in step 333.

If the ACTUATE LEVEL flag is found to be cleared at decision point 328, the loop checks the status of the END OF TRAVEL flag at decision point 335. If it is clear, then antenna extension is appropriate; and the loop checks to see if the down transistor is off at decision point 336 by checking the state of the output port of the NOT RETRACT signal. If the answer is yes, the loop turns on the up transistor by setting the NOT EXTEND output low and the DISABLE output low in step 337 and then setting the DIRECTION flag to indicate extension in step 338 before setting the MOTOR RUNNING flag in step 333. If the END OF TRAVEL flag is found to be set at decision point 335, then the antenna is fully extended and no further extension is desired. Therefore, the loop calls subroutine MOTOFF in step 340, sets the WATCHDOG flag in step 341 and determines if the actuate level flag is set at decision point 342. If it is set, the loop returns in a subloop to step 341; if not, it calls subroutine RESET in step 343 and then proceeds to a decision point 345. The loop also reaches decision point 345 from decision points 330 or 336 if the incorrect transistor is found to be on or from step 333.

At decision point 345 the loop determines if the 500 MS START WINDOW is complete. If so, the loop skips to entry point D in FIG. 4*c* and thus checks for motor stall as will be described; if not, the loop determines, at decision point 346, if the DIRECTION flag is set. If so, the loop returns to entry point A in FIG. 4*a*. If not, the loop determines, at decision point 347, if the 45 SECOND TIMER has timed out. If not, the loop returns to entry point A in FIG. 4*a*; if so the loop executes subroutine MOTOFF in step 348 and then goes through a power down routine 350. Thus a 45 second time out leads to power down in antenna retraction.

Referring to FIG. 4*c*, entry point D leads to decision point 351, in which the 500 MS STALL WINDOW is checked. If the flag is not set, the loop returns to entry point S in FIG. 4*b*; if it is set, the loop determines at decision point 352 if the STALL COUNT is greater than 1. If so, in step 353 the loop clears the STALL WINDOW COMPLETE flag, the 500 MS TIMER and the STALL COUNT and returns to entry point S in FIG. 4*b*. If not, subroutine MOTOFF is called in step 355 and the DIRECTION flag is checked at decision point 356. If the DIRECTION flag is cleared, so that the antenna is in the retraction mode, the loop determi es at decision point 357 if COUNT1 equals zero. If not, then the antenna is stalled far short of its retracted position, since COUNT1 is the high byte of the position count. Therefore, the WATCHDOG flag is set in step 358 and the 45 SECOND COMPLETE flag is checked at decision point 360. If 45 seconds have elapsed, the program proceeds through entry point P to power down routine 350 in FIG. 4*b*. This particular route to the power down routine is used only when stall is detected. However, if there is motor rotation without antenna movement, such as might be the case with a broken drive cable, the time out portion of the MAIN loop shown at 347, 348, 350 of FIG. 4*b* is effective. Returning to FIG. 4*c*, if 45 seconds are not found to be elapsed at decision point 360, the ACTUATE LEVEL flag is checked at decision point 362. If it is set, the loop returns in a subloop to step 358; if not, the loop calls subroutine RESET in step 363 and returns to entry point S in FIG. 4*b*.

If COUNT1 is found to be zero at decision point 357, the loop determines at decision point 365 if COUNT is less than or equal to 3. If so, the antenna is treated as being retracted; and COUNT is cleared in step 366. The current limit is enabled, if it is not already, by clearing the CURRENT output of computer 37 in step 367 and the loop proceeds to step 358. Thus, in a normal retraction, the low current limiting value is turned on for full current limiting as the decreasing position count passes 31 and, when stall is detected with the position count less than or equal to three, the position count is reindexed to zero and the motor current is limited to a low value to prevent antenna drive cable stress until the system powers down. If the position count is greater than 3 at decision point 365, the status of current limiting is determined at decision point 368. If the CURRENT output is found to be cleared, the antenna may have been stopped by current limiting. Therefore, the CURRENT output is set high in step 370 so that the system can try one more time at a higher current value to fully retract the antenna; and the loop proceeds to step 363 for a RESET subroutine call. If the CURRENT output is found to be set high, the loop proceeds to step 367, in which it is set low, to prepare for power down or a new extend command as has been described. Thus, the current limit will be in the proper mode if the radio is turned on again.

Returning to decision point 356, if the DIRECTION flag is found to be set, the RETRY COUNT is checked at decision point 371. If it is greater than or equal to 3, the WATCHDOG flag is set in step 372 and the ACTUATE LEVEL flag checked at decision point 373. If it is set, the loop proceeds to step 363 and a RESET subroutine call. If it is cleared, the loop returns in a subloop to step 372. If, at decision point 371, the RETRY COUNT is less than 3, the loop increments the RETRY COUNT and clears the 5 SECOND TIMER and 5 SECOND TIMER COMPLETE flag in step 375. The loop next sets the WATCHDOG flag in step 376 and determines, at decision point 377, if the 5 SECOND COMPLETE flag is set. If the answer is yes the loop proceeds to step 363; if the answer is no the loop determines, at decision point 378, if the ACTUATE LEVEL flag is set. If it is set, the loop proceeds to step 363; if not, the loop returns in a subloop to step 376. Thus, stall in the extend direction results in up to three retries automatically with 5 second pauses therebetween.

The embodiments of the invention in which an exclusive property or privilege is claimed are defined as follows:

1. A power antenna control for a motor vehicle having antenna drive means effective to extend and retract the antenna relative to the vehicle, the antenna drive means including a DC motor having an armature, the control comprising, in combination:

pulse signal means responsive to movement of the antenna drive means to generate pulses for equal predetermined increments of antenna travel;

a first counter responsive to the pulse signal means while the antenna is extending to change its count in a first direction and while the antenna is retracting to change its count in the opposite direction to thereby maintain a count indicative of antenna position;

a second counter responsive to the pulse signal to count in a first direction;

means responsive to the first counter during antenna extension to deactivate the antenna drive means when the count of the first counter indicates a predetermined extended antenna position;

means effective to periodically monitor the count of the second counter and reset the count to an initial value and, when said monitored count is less than a predetermined count indicating motor stall, to generate a stall signal;

means responsive to the stall signal during antenna retraction to deactivate the antenna drive means and, if the count of the first counter is within a predetermined count of full retraction, to reset the count of the first counter to the count indicating full retraction;

means activatable to limit the current in the motor armature to a predetermined maximum value; and means responsive to the first counter to activate the current limiting means only when the count of the first counter is within a range corresponding to a predetermined range of antenna position close to full retraction.

2. The power antenna control of claim 1 in which the pulse signal means includes a Hall effect device adapted to generate pulses with rotation of the motor armature.

3. The power antenna control of claim 1 in which the predetermined extended antenna position is full extension.

4. The power antenna control of claim 1 in which the predetermined extended antenna position is a predetermined position less than full extension.

5. The power antenna control of claim 1 in which the means responsive to the stall signal during antenna retraction to deactivate the antenna drive means is adapted, if the count of the first counter is not within the predetermined count of full retraction but the current limiting means is activated, to deactivate the current limiting means and thus permit another attempt at full retraction.

6. The power antenna control of claim 1 further comprising means responsive to the stall signal during antenna extension before the predetermined extended antenna position is reached to deactivate the antenna drive means, wait a predetermined time period and reactivate the antenna drive means for another attempt.

* * * * *